United States Patent
Hara et al.

(10) Patent No.: US 9,325,034 B2
(45) Date of Patent: Apr. 26, 2016

(54) SECONDARY BATTERY WITH ORGANIC ELECTROLYTIC SOLUTION

(75) Inventors: Kenji Hara, Iga (JP); Tatsuhiko Kawasaki, Hitachinaka (JP); Hirofumi Takahashi, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 370 days.

(21) Appl. No.: 13/883,500

(22) PCT Filed: Nov. 18, 2010

(86) PCT No.: PCT/JP2010/070545
§ 371 (c)(1),
(2), (4) Date: Jul. 19, 2013

(87) PCT Pub. No.: WO2012/066663
PCT Pub. Date: May 24, 2012

(65) Prior Publication Data
US 2013/0295447 A1 Nov. 7, 2013

(51) Int. Cl.
*H01M 10/0567* (2010.01)
*H01M 10/0525* (2010.01)
*H01M 2/16* (2006.01)
*H01M 10/052* (2010.01)

(52) U.S. Cl.
CPC ........ *H01M 10/0567* (2013.01); *H01M 2/1653* (2013.01); *H01M 2/1686* (2013.01); *H01M 10/052* (2013.01); *H01M 10/0525* (2013.01); *H01M 2300/0025* (2013.01)

(58) Field of Classification Search
CPC ............... H01M 10/0525; H01M 10/0567; H01M 2300/0025; H01M 2/1653; H01M 2/1686
USPC ........................................ 429/188
See application file for complete search history.

(56) References Cited

FOREIGN PATENT DOCUMENTS

| JP | 03-081953 A | 4/1991 |
|---|---|---|
| JP | 1204160 A | 1/1999 |
| JP | 2007-200695 A | 8/2007 |
| JP | 4106856 B2 | 4/2008 |
| JP | 101208198 A | 6/2008 |
| JP | 2008-255307 A | 10/2008 |
| JP | 101476138 A | 7/2009 |

OTHER PUBLICATIONS

Chinese Office Action, Chinese Patent Appln. No. 201080070216.5, Dec. 2, 2014, 9 pgs.

*Primary Examiner* — Jonathan Jelsma
*Assistant Examiner* — Rashid Alam
(74) *Attorney, Agent, or Firm* — Volpe and Koenig, P.C.

(57) ABSTRACT

Disclosed herein is a highly reliable secondary battery with organic electrolytic solution. The secondary battery has a set of plates for the positive and negative electrodes, with a separator interposed between them, and an organic electrolytic solution composed of an organic solvent and an electrolyte dissolved therein. The organic electrolytic solution contains polyethylene glycol and bis-(3-Sulfopropyl)disulfide.

5 Claims, 4 Drawing Sheets

SECONDARY BATTERY WITH ORGANIC ELECTROLYTIC SOLUTION

TECHNICAL FIELD

The present invention relates to a secondary battery with organic electrolytic solution having a separator interposed between the positive electrode and the negative electrode.

BACKGROUND ART

Secondary batteries are usually subject to contamination with metal impurities in the form of metal powder resulting from abrasion that occurs during their manufacture. Such metal contaminants electrochemically dissolve and disperse into the electrolytic solution under the influence of the electric potential of the positive electrode. The dissolved metal in the form of ion reaches the negative electrode and separates out there under the influence of the electric potential of the negative electrode. The metal which has separated out occasionally penetrates through the separator to bring about microshorts between the positive and negative electrodes.

There is a technology of preventing the deterioration of plates and the occurrence of microshorts by incorporating the electrolytic solution with sodium 1,3,6-naphthalene-trisulfonate or potassium thiocyanate as a leveling agent to suppress metal ion separation, as disclosed in Patent Document 1.
Patent Document 1: JP-2001-357874-A

SUMMARY OF THE INVENTION

Problems to be Solved by the Invention

Unfortunately, the forgoing technology of incorporating the electrolytic solution with sodium 1,3,6-naphthalene-trisulfonate or potassium thiocyanate has the disadvantage of being incapable of completely preventing metal ion separation per se despite its ability to suppress metal ion separation.

The problem with metal separation is that the metal which has once separated out on the electrode surface causes metal separation to proceed from the point of separation. The resulting deposited metal forms dendrites which grow into needles and penetrate through the separator from the negative electrode toward the positive electrode. This is true particularly in the case where the electrode is provided with a current collector made of zinc, copper, or silver. Such dendrites grow fast and bring about internal microshorts which lead to conduction between the positive and negative electrodes, which results in a decrease in battery voltage.

It is an object of the present invention to provide a secondary battery with organic electrolytic solution which has outstanding life characteristics owing to controlled voltage decrease.

Means for Solving the Problems

The secondary, battery with organic electrolytic solution according to the present invention is characterized in having an organic electrolytic solution which contains polyethylene glycol and bis-(3-Sulfopropyl)disulfide.

Effects of the Invention

The present invention provides a secondary battery with organic electrolytic solution which has outstanding life characteristics.

DESCRIPTION OF REFERENCE NUMERALS

Figure 1:
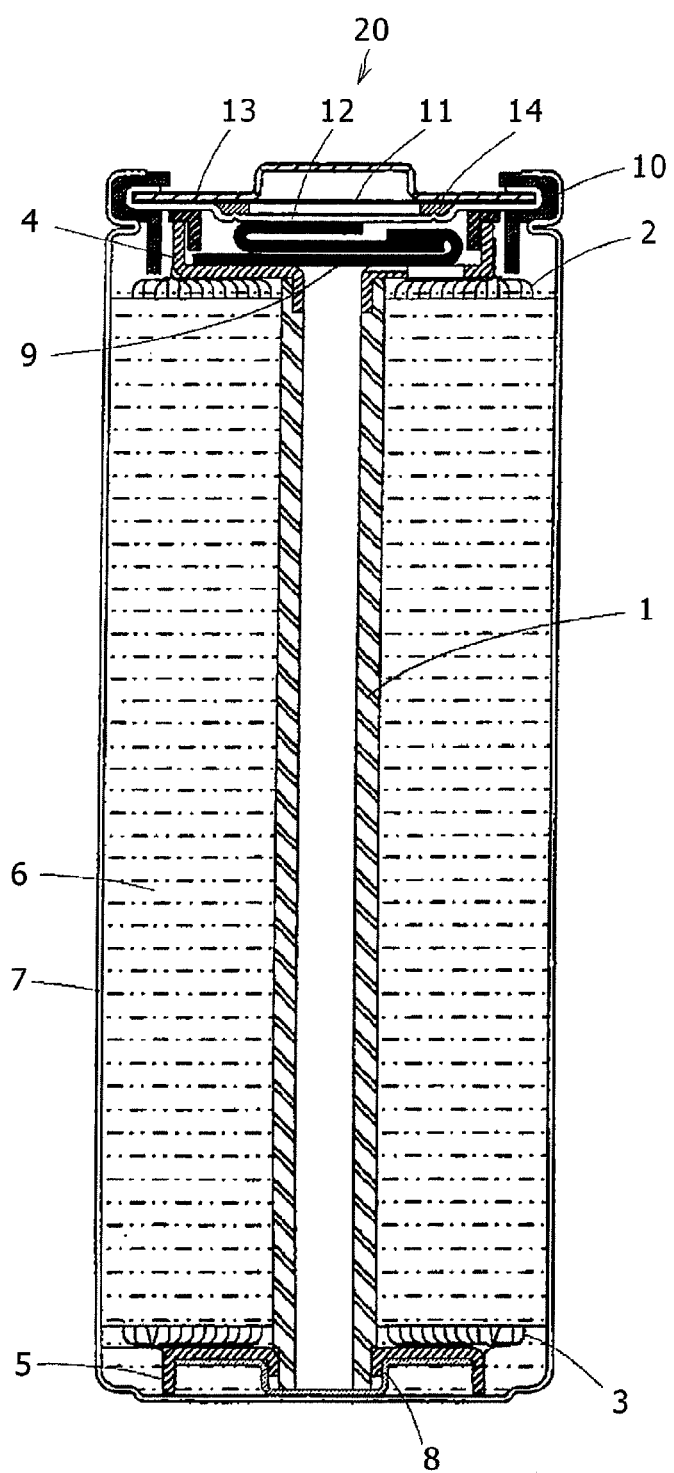
FIG. 1 is a sectional view of the secondary battery with organic electrolytic solution pertaining to the first embodiment.

20: Secondary battery with organic electrolytic solution
21: Active material layer for positive electrode
22: Current collector (Al foil) for positive electrode
23: Active material layer for negative electrode
24: Current collector (Cu foil) for negative electrode
25: Separator
26: Polyethylene resin layer
27: Polypropylene resin layer
28: Deposited metal

BEST MODE FOR CARRYING OUT THE INVENTION

The secondary battery according to the present invention is characterized in that the organic electrolytic solution therein contains polyethylene glycol and bis-(3-Sulfopropyl)disulfide as additives. These additives combined together prevent deposited metal from growing from the negative electrode to the positive electrode through a passage penetrating through the separator.

These additives are considered to make the electrolytic solution wet the electrode surface more easily and break deposited metal into fine particles. Moreover, they cause deposited metal ion to spread along the electrode surface, thereby allowing deposited metal to grow into a gently sloping mountain shape. The result is a reduced growth of deposited metal in the direction penetrating through the separator in comparison with the amount of deposited metal. This leads to an extended period for microshorts to take place.

Particularly in the case where the current collector of the negative electrode is made of zinc, copper, silver, or the like, and this structure causes deposited metal to grow, taking on a needle form, from the negative electrode to the positive electrode through the separator. The above-mentioned additives retard the growth of impurities into needles that penetrate through the separator. The result is the prevention of microshorts and voltage decrease which otherwise are caused by deposited metal in the secondary battery. This leads to a secondary battery with organic electrolytic solution which has a long life and a high reliability.

In the case where the secondary battery is used as the electric source for the electric automobile or the hybrid automobile equipped with an internal combustion engine and an electric motor in combination, the automobile is supplied with electric power from a battery module consisting of a plurality of secondary batteries which are electrically connected in series to generate a high voltage. Individual units of the battery module are provided with electric circuits for voltage control.

The secondary battery mounted on an electric automobile is little vulnerable to microshorts during driving in which it undergoes charging and discharging repeatedly. By contrast, it is much vulnerable to microshorts during parking in which it remains idle and continues to decrease in voltage. This voltage decrease does not take place in all the units of the battery module; some units decrease in voltage more significantly than their neighboring ones. This seriously damages the performance and reliability of the battery module.

There may be an instance in which at least one of the secondary batteries constituting the battery module differs from the remainder in battery performance (such as voltage and capacity) or degrades in battery performance due to change with time. In this case, the anomalous units adversely affect the normal ones, thereby aggravating the overall performance of the battery module. Among anomalies is variation in self discharge from one unit to another. In this case, individual units fluctuate in voltage decrease, and this greatly shortens the life of the battery module as a whole. Moreover, great variation in voltage decrease among the secondary batteries disables the control circuit for voltage regulation of the secondary battery. This aggravates the reliability of the battery module.

The cause of voltage decrease is the microshorts between the positive and negative electrodes which occur when metal separates out from metal ions in the battery at the time of charging. And such voltage decrease results in variation in voltage among the secondary batteries with organic electrolytic solution connected to one another. The present invention was completed to tackle this problem and improve the reliability of the battery module.

First Embodiment

The following is a detailed description, illustrated by the accompanying drawings, of the secondary battery with organic electrolytic solution pertaining to the first embodiment of the present invention.

The secondary battery with organic electrolytic solution pertaining to this embodiment is composed of a positive electrode (capable of releasing and occluding lithium ions upon charging and discharging), a negative electrode (capable of occluding and releasing lithium ions upon charging and discharging), and a set of plates arranged between them, the plates being separated from each other by a separator interposed between them. The separator is an ion-permeable insulating layer in the form of microporous membrane of polyolefin. The plates are kept wet with the organic electrolytic solution held in the battery container. The organic electrolytic solution is composed of an organic solvent and an electrolyte dissolved therein. The fact that the organic electrolytic solution contains polyethylene glycol and bis-(3-Sulfopropyl) disulfide constitutes an essential feature of the present invention.

The following describes the structure of and the method for production of the secondary battery with organic electrolytic solution pertaining to the first embodiment.

<Production of Cell>

The first embodiment covers the lithium-ion secondary battery of cylindrical type 20 shown in FIG. 1, which is composed of an end-closed cylindrical battery container 7 of nickel-plated steel and a set of belt-like positive and negative electrodes 6 spirally wound around an axial core 1 (which is a hollow cylindrical shaft of polypropylene), with a separator interposed between the two electrodes.

On the top of the set of electrodes 6 is arranged an aluminum current collector ring 4 for collecting electric potential from the positive electrode plate to approximately extension of the axial core 1. The aluminum current collector ring 4 is fixed to the axial core 6. The current collector ring 4 for the positive electrode has a flange integrally extending from the periphery thereof, to which is ultrasonically welded the end of the lead 2 extending from the positive electrode.

Above the current collector ring 4 for the positive electrode is arranged a discoid battery lid 11 which functions as the external terminal of the positive electrode. The battery lid 11 is composed of a lid case 12, a lid cap 13, a valve presser (not shown) to keep airtightness, and a valve (not shown) which breaks and opens in response to the increased internal pressure. For assembling, they are placed on top of the other and the periphery of the lid case 12 is crimped.

Above the current collector ring 4 for the positive electrode are also arranged two leads 9 for the positive electrode, each lead being constructed of aluminum ribbons laminated one over another. One of the two leads 9 has its one end fixed to the top of the current collector ring 4 for the positive electrode. The other of the two leads 9 has its one end welded to the lower side of the lid case 12. The two leads 9 for the positive electrode have the other ends connected by welding to each other.

On the other hand, under the set of plates 6 is arranged a current collector ring 5 (made of copper) for the negative electrode in order to collect electric potential from the negative electrode plate. The current collector ring 5 for the negative electrode has its inner peripheral surface fixed to the outer peripheral surface of the lower end of the axial core 1. Also, the current collector ring 5 for the negative electrode has the outer peripheral edge to which is welded a lead 3 extending from the negative electrode.

A copper lead 8 for the negative electrode is welded to the lower part of the current collector ring 5 for the negative electrode for electric conduction. The lead 8 for the negative electrode is also welded to the inner bottom of the battery container 7. According to this embodiment, the battery container 7 measures 40 mm in outside diameter and 39 mm in inside diameter.

The battery lid 11 is fixed by crimping to the upper part of the battery container 7 with the gasket 10 (made of insulating and heat-resisting EPDM rein) interposed between them. This structure tightly seals the lithium ion secondary battery 20.

The battery container 7 is filled with an organic electrolytic solution (not shown). The organic electrolytic solution is one which is composed of an organic solvent and an electrolyte dissolved therein. To be more specific, it is a solution of a 1:2 mixed solvent (by volume) of ethylene carbonate and dimethyl carbonate (both being carbonate esters), which contains lithium hexafluorophosphate (LiPF$_6$) as lithium salt in an amount of 1 mol per liter dissolved therein.

Incidentally, the lithium ion secondary battery 20 pertaining to this embodiment does not have any circuit breaker, such as PTC (Positive Temperature Coefficient) element, which breaks the lead for the positive or negative electrode in response to a temperature increase in the battery.

The set of plates 6 are arranged between the positive electrode and the negative electrode and wound around the axial core 1 in such a way that they do not come into direct contact with each other, with a separator interposed between them. The separator is an ion-permeable insulating layer formed from a microporous polyolefin membrane, measuring 90 mm wide and 40 μm thick, for example. The set of plates 6 is provided with the lead 2 for the positive electrode and the lead 3 for the negative electrode at the mutually opposing ends thereof (or both sides in the axial direction).

The flange for the set of plates 6 and the current collector ring 4 of the positive electrode has its peripheral surface entirely covered with an insulating coating (not shown). The insulating coating is an adhesive tape composed of a polyamide substrate and an adhesive (hexamethacrylate) applied to one side thereof. This adhesive tape is wound in one layer or more around the peripheral surface of the flange and the peripheral surface of the set of plates. The set of plates is made to have a diameter of 38±0.1 mm by properly adjusting the length of the positive electrode, the negative electrode, and the separator.

<Production of Electrode>

The negative electrode plates (which constitute the set of plates 6) have the rolled copper foil (10 μm thick) as the current collector for the negative electrode. The rolled copper foil has its both sides coated uniformly and homogeneously with a negative electrode mixture as the negative electrode active material containing graphite powder which is capable of occluding and releasing lithium ions.

The negative electrode mixture typically consists of graphite powder (92 parts by weight) and polyvinylidene fluoride (PVDF) as a binder (8 parts by weight). The coating of the negative electrode mixture onto the rolled copper foil is accomplished by application of a dispersion solvent of N-methyl-2-pyrrolidone (NMP).

The amount of graphite to be applied should be controlled such that the ratio between the amount of lithium ions to be released from the positive electrode, and the amount of lithium ions to be occluded into the negative electrode is larger than 1:1, both amounts being at the time of initial charging after battery production.

The rolled copper foil has one edge (30 mm wide) on its lateral side extending in the lengthwise direction, the edge being left uncoated with the negative electrode mixture. The uncoated part is notched like the teeth of a comb, and the parts left after notching form the leads for the negative electrode. The adjoining negative electrode leads are 5 mm wide each and 50 mm apart from each other. After coating with the negative electrode mixture, the coated negative electrode is dried and pressed by a heatable roll press so that the layer of the negative electrode mixture has a porosity of about 35 vol %. Finally, it is slit into strips each measuring 86 mm wide.

On the other hand, the positive electrode is provided with an aluminum foil (typically 20 μm thick) as its current collector. The aluminum foil has its both sides coated with a positive electrode mixture which is composed of the following components: a lithium-transition metal multiple oxide and an inorganic compound combined together (85 parts by weight) by the method mentioned above, which is a positive electrode; graphite powder (8 parts by weight) which is a principal conducting material; acetylene black (2 parts by weight) which is a secondary conducting material; and PVDF (5 parts by weight) which is a binder. The coating of the aluminum foil with the positive electrode mixture is accomplished by application of a dispersion solvent of NMP.

As in the case of the negative electrode plate, the aluminum foil has one edge (30 mm wide) on its lateral side extending in the lengthwise direction, the edge being left uncoated with the positive electrode mixture. The uncoated part functions as the lead for the positive electrode. The adjoining positive electrode leads 2 are 5 mm wide each and 50 mm apart from each other. After coating with the positive electrode mixture, the coated positive electrode is dried and pressed (in the same way as the negative electrode) and finally slit into strips each measuring 82 mm wide.

<Production of Electrolytic Solution>

First, a mixed solution is prepared from ethylene carbonate (EC) and dimethyl carbonate (DMC) in a ratio of 1:2 by volume. Next, in this mixed solution is dissolved lithium hexafluorophosphate (LiPF6) in an amount of 1 mol/liter. The resulting organic electrolytic solution (10 kg) is incorporated with polyethylene glycol in varied amounts from 100 mg to 100 g. This step is followed by stirring for 10 minutes in a sealed tank filled with argon gas. The resulting solution is further incorporated with bis-(3-Sulfopropyl)disulfide in an amount equivalent to 0.5 to 2 wt % of the amount of the polyethylene glycol added. This step is followed by stirring for 1 hour in the same tank as mentioned above. Thus there is obtained the electrolytic solution as desired.

<Measurement of Output from the Cylindrical Cell>

The lithium ion secondary battery 20 prepared as mentioned above was examined for weight, battery capacity, and battery resistance. The battery capacity was measured by charging the battery at a constant current (one hour rate (1 C)) and a constant voltage (limited to 4.1 V) at 25±2° C. for 3 hours and then discharging the battery at a constant current (one hour rate (1 C)) until the voltage decreased to 2.7 V.

The battery resistance was measured as follows. First, the battery is fully charged at a constant current (one hour rate (1 C)) and a constant voltage (limited to 4.1 V) at 25±2° C. for 3 hours. Then the battery is discharged at 1 A, 3 A, and 6 A, for 11 seconds each, and the battery voltage is measured 5 seconds after each discharging. The three voltage values measured in this way are plotted against the current values and the absolute value of the slope of the straight line is regarded as the battery resistance.

<Measurement of Voltage Decreasing Rate of the Cylindrical Battery and Examination of the Cylindrical Battery by Disassembly>

Figure 2:
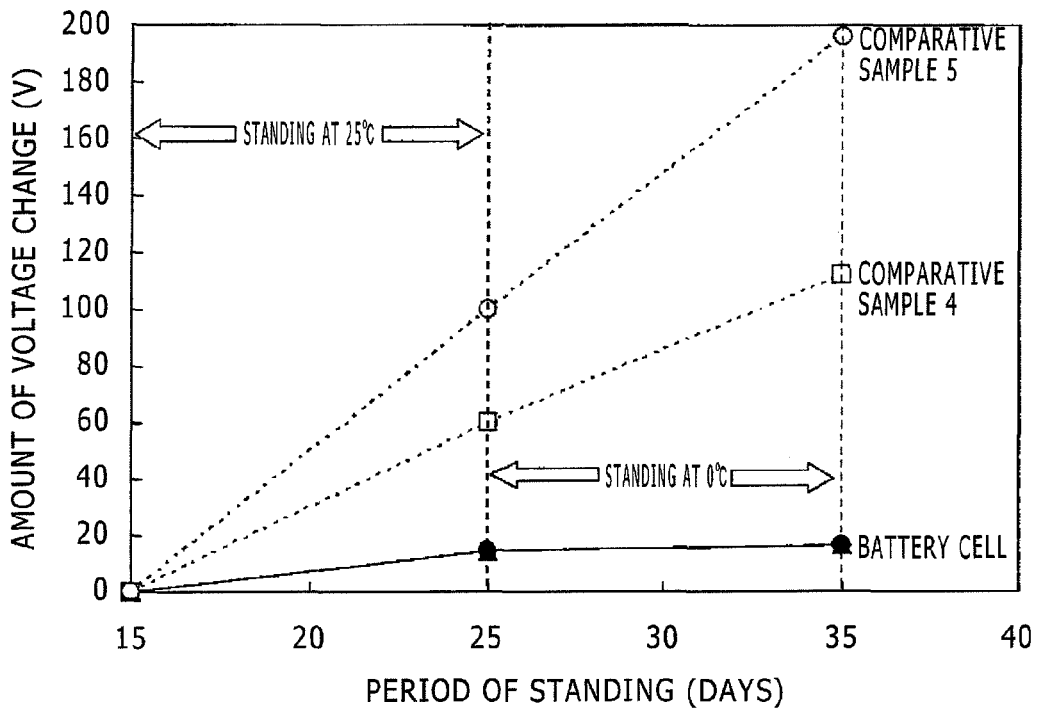
FIG. 2 is a graph showing the voltage change that occurs when the secondary battery is allowed to stand after initial charging.

FIG. 2 is a graph showing the voltage change that occurs while the battery is allowed to stand after initial charging.

The voltage decreasing rate is measured as follows. The battery is charged at 3.7 V and 2 hour rate for 3 hours. The battery voltage is measured. Then, the battery is allowed to stand at 25±2° C. for a prescribed period of time (standing at 25° C.). After standing for 15 days and 25 days, the battery voltage is measured. The voltage change that occurs during the period of standing is divided by 10 so as to calculate the average voltage decreasing rate in terms of mV/day.

The battery is further allowed to stand at 0±2° C. for 10 days. The battery voltage is measured on the zeroth day and tenth day. The voltage change that occurs during standing is divided by 10 days so as to calculate the average voltage decreasing rate in terms of mV/day in the same way as mentioned above.

The secondary battery with organic electrolytic solution gradually decreases in battery voltage due to self discharge during standing. This voltage decrease is attributable to electrochemical factors involved in the electrodes and electrolytic solution and also to internal short-circuits.

In the case where the voltage decrease is caused by the electrochemical action of the electrodes and electrolytic solution, the voltage decreasing rate of the secondary battery with organic electrolytic solution depends proportionally on the ambient temperature. That is, the higher the temperature, the larger the voltage decrease is.

On the other hand, in the case where the voltage decrease is caused by internal short-circuits, the voltage decreasing rate is hardly affected by the ambient temperature but is affected mostly by the area of contact between the positive and negative electrodes and also by the electron conductivity of the substances.

Consequently, if the voltage decreasing rate at room temperature is compared with that at low temperatures, it will be possible to judge whether the voltage decrease that occurs during standing is caused by the electrochemical reaction or the internal short-circuits. Such judgment will suggest the occurrence of minute internal short-circuits if there is any.

For example, FIG. 2 shows that the comparative samples 4 and 5 are the same in the voltage decreasing rate during standing regardless of temperature (i.e., 25° C. and 0° C.). This suggests that their voltage decrease is caused by physical contact between the positive and negative electrodes, which indicates the presence of mircoshorts.

By contrast, FIG. 2 also shows that the battery cell pertaining to this embodiment decreases in voltage at a smaller rate at 0° C. than at 25° C. This suggests that the voltage decreasing rate depends on the ambient temperature and the voltage decrease is caused by electrochemical reaction, which indicates the absence of microshorts.

Those batteries which suffered voltage decrease due to microshorts were disassembled and the shorted segments were observed under a scanning electron microscope (SEM) and then underwent element analysis by energy dispersive X-ray spectroscopy (EDX).

EXAMPLES

A positive electrode active material was prepared, which is lithium-nickel-manganese-cobalt multiple oxide ($LiMn_{0.3}Co_{0.3}Ni_{0.4}O_2$) having an average particle diameter of 6 μm. The resulting product (85 pbw) was mixed with scaly graphite (10 pbw) as a conducting material and PVDF (5 pbw) as a binder. The resulting mixture was added to NMP (as a dispersing medium) with stirring to make a slurry. The resulting slurry was applied to both sides of a 20-μm thick aluminum foil. This step was followed by drying, pressing, and slitting into 82-mm wide strips. Thus there was obtained the positive electrode plate.

In addition, a mixture composed of graphite powder (92 pbw) as a negative electrode active material and polyvinylidene fluoride (8 pbw) was prepared. This mixture was added to NMP (as a dispersing medium) with stirring to make a slurry. The resulting slurry was applied to both sides of a 10-μm thick rolled copper foil. This step was followed by drying, pressing, and slitting into 86-mm wide strips. Thus there was obtained the negative electrode plate.

The thus obtained beltlike positive and negative electrode hoops are provided with a positive electrode tub terminal and a negative electrode tub terminal at their upper and lower ends respectively. Then they are wound around on top of the other, with a separator interposed between them, around a core. The separator is a 30-μm thick polyethylene film that permits the passage of lithium ions. This winding is performed in such a way that the ends of the positive and negative electrode hoops (except for the positive and negative tub terminals) do not extend beyond the separator edges (in the widthwise and lengthwise directions) and the positive and negative electrodes do not come into contact with each other. The thus wound positive and negative electrode hoops, which are as long as the electrode plate, are cut. Thus there is obtained the set of windings 6.

Next, an organic electrolytic solution was prepared from polyethylene glycol and bis-(3-Sulfopropyl)disulfide dissolved in an organic solvent. This organic solvent is a 1:2 mixture (by volume) of ethylene carbonate (EC) and dimethyl carbonate (DMC), which contains lithium hexafluorophosphate (LiPF6) dissolved therein in an amount of 1 mol/liter. This organic electrolytic solution was filled into the battery can 7, which was subsequently had its opening closed with the battery lid 11, with the gasket 10 interposed between them. In this way there was obtained the secondary battery 20 with organic electrolytic solution. Finally, the secondary battery 20 underwent initial charging with a constant voltage and a constant current, so that it was made active.

In this embodiment, the samples of the secondary battery 20 with organic electrolytic solution vary in the amount of polyethylene glycol and bis-(3-Sulfopropyl)disulfide dissolved in the organic electrolytic solution. These samples are designated as battery cells 1 to 3.

In order to prove the effect of the embodiment, there were produced comparative samples of the secondary battery with organic electrolytic solution (designated as battery cells 4 to 20). They differ from the above-mentioned ones in that the layer of the positive electrode active material contains 10 ppm of iron, nickel, or copper powder (about 10 to 15 μm large) as metal contaminant which was intentionally added to promote the separation of metal ions.

For the purpose of comparison, Comparative Samples 1 to 6 were prepared which differ from the above-mentioned ones as indicated following: the organic electrolytic solution contains neither polyethylene glycol nor bis-(3-Sulfopropyl)disulfide (Comparative Sample 1); the organic electrolytic solution contains only bis-(3-Sulfopropyl)disulfide of polyethylene glycol and bis-(3-Sulfopropyl)disulfide (Comparative Samples 2 to 4); the organic electrolytic solution contains only polyethylene glycol of polyethylene glycol and bis-(3-Sulfopropyl)disulfide (Comparative Samples 5 and 6).

In addition, Comparative Samples 2 to 6 employ the layer of the positive electrode active material which contains 10 ppm of iron, nickel, or copper powder (about 10 to 15 μm large) as metal contaminant which was intentionally added.

The battery cells 1 to 20 according to the embodiment and the comparative samples 1 to 6 were examined for battery resistance and voltage decreasing rate. The results are shown in Table 1 below.

TABLE 1

| | Metal contaminant added to positive electrode active material layer | Amount of polyethylene glycol added wt % | Amount of bis-3-sulfopropyl-sulfide-2-sodium added wt % | Battery resistance Ratio(*) | Voltage decreasing rate (at 25° C.) mV/day | Voltage decreasing rate (at 0° C.) mV/day | Microshorts |
|---|---|---|---|---|---|---|---|
| Comparative sample 1 | None | 0 | 0 | 100 | 1.5 | 0.2 | None |
| Battery cell 1 | None | 0.001 | 1.0 | 101 | 1.5 | 0.2 | None |
| Battery cell 2 | None | 0.005 | 1.0 | 101 | 1.5 | 0.2 | None |
| Battery cell 3 | None | 0.01 | 1.0 | 103 | 1.5 | 0.2 | None |
| Comparative Sample 2 | Iron powder | 0 | 1.0 | 100 | 3.0 | 2.8 | Yes |
| Battery cell 4 | Iron powder | 0.001 | 1.0 | 101 | 1.5 | 0.2 | None |
| Battery cell 5 | Iron powder | 0.005 | 1.0 | 101 | 1.5 | 0.3 | None |
| Battery cell 6 | Iron powder | 0.01 | 1.0 | 103 | 1.5 | 0.2 | None |
| Battery cell 7 | Iron powder | 0.015 | 1.0 | 108 | 1.8 | 0.4 | None |
| Comparative Sample 3 | Nickel powder | 0 | 1.0 | 100 | 5.0 | 4.6 | Yes |
| Battery cell 8 | Nickel powder | 0.001 | 1.0 | 101 | 1.5 | 0.2 | None |
| Battery cell 9 | Nickel powder | 0.005 | 1.0 | 102 | 1.5 | 0.2 | None |
| Battery cell 10 | Nickel powder | 0.01 | 1.0 | 104 | 1.5 | 0.2 | None |
| Battery cell 11 | Nickel powder | 0.015 | 1.0 | 110 | 1.6 | 0.3 | None |
| Comparative Sample 4 | Copper powder | 0 | 1.0 | 100 | 6.0 | 5.2 | Yes |
| Battery cell 12 | Copper powder | 0.001 | 1.0 | 101 | 1.5 | 0.2 | None |
| Battery cell 13 | Copper powder | 0.005 | 1.0 | 101 | 1.5 | 0.2 | None |
| Battery cell 14 | Copper powder | 0.01 | 1.0 | 103 | 1.5 | 0.2 | None |
| Battery cell 15 | Copper powder | 0.015 | 1.0 | 107 | 1.6 | 0.3 | None |
| Comparative Sample 5 | Copper powder | 0.005 | 0 | 101 | 10.0 | 9.6 | Yes |
| Battery cell 16 | Copper powder | 0.005 | 0.2 | 101 | 5.0 | 4.3 | None |
| Battery cell 17 | Copper powder | 0.005 | 0.5 | 102 | 1.5 | 0.2 | None |
| Battery cell 18 | Copper powder | 0.005 | 1.5 | 102 | 1.5 | 0.2 | None |
| Battery cell 19 | Copper powder | 0.005 | 2.0 | 102 | 1.5 | 0.2 | None |
| Battery cell 20 | Copper powder | 0.005 | 2.5 | 103 | 2.0 | 0.4 | None |
| Comparative Sample 6 | Copper powder | 0.01 | 0 | 103 | 5.0 | 4.7 | Yes |

(*)Ratio to comparative samples 1.

It is noted from Table 1 that Comparative Samples 2 to 6, in which the positive electrode active material contains intentionally added metal powder of varied kind, experienced voltage decrease due to microshorts during standing at 25±2° C. that followed initial charging. By contrast, however, the battery cells 4 to 20 were very low in the voltage decreasing rate and this suggests the absence of microshorts in them.

Examination into the disassembled battery shows that the battery cells 4 to 20 suffered the separation of metal ions on the surface of the negative electrode but did not suffer the contact between the positive and negative electrodes. This suggests the absence of microshorts.

It was found that the separator locally discolored from brown to black at the part in contact with that part of the negative electrode surface on which metal had deposited. Such a discolored part is useful to study the state and growth of metal deposits by observation of its cross section.

Figure 3:
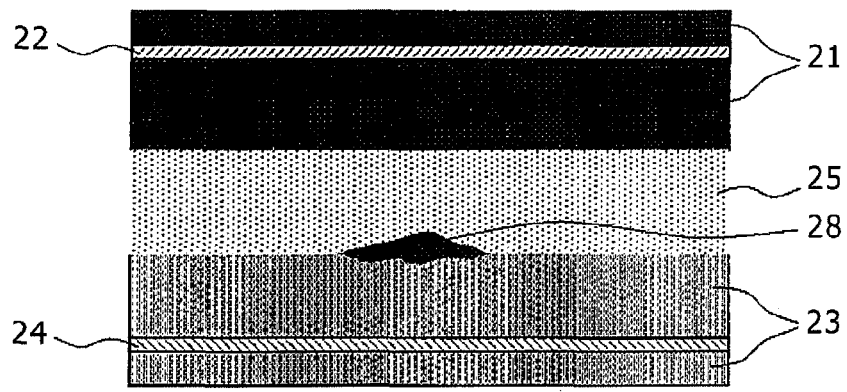
FIG. 3 is a sectional view showing the state of separation which is observed when nickel powder is added to the active material layer of the positive electrode of the battery cell pertaining to the embodiment of the present invention.
Figure 4:
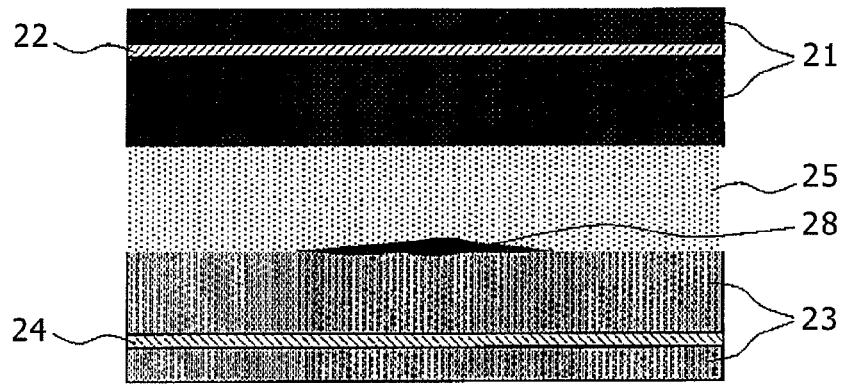
FIG. 4 is a sectional view showing the state of separation which is observed when iron powder is added to the active material layer of the positive electrode of the battery cell pertaining to the embodiment of the present invention.
Figure 5:
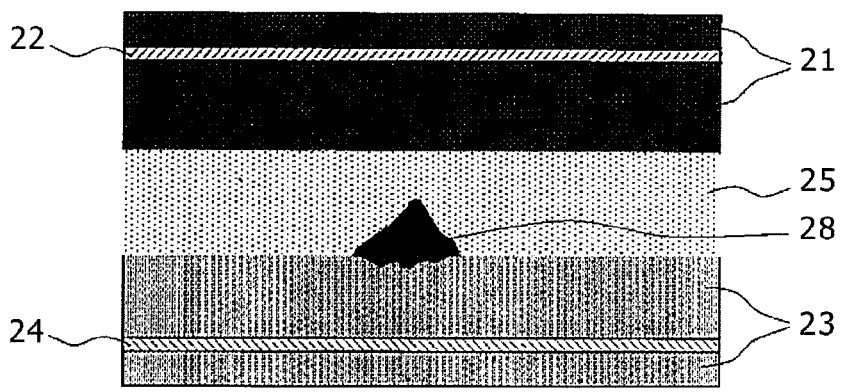
FIG. 5 is a sectional view showing the state of separation which is observed when copper powder is added to the active material layer of the positive electrode of the battery cell pertaining to the embodiment of the present invention.
Figure 6:
FIG. 6 is a sectional view showing the state of separation which is observed when copper powder is added to the active material layer of the positive electrode of the battery cell for comparison.

FIGS. 3 to 6 are schematic sectional views showing the state of separation of metal ions on the surface of the negative electrode. FIG. 3 shows the state of separation which was observed when nickel powder is added to the layer of the positive electrode active material in the battery cell pertaining to the Example. FIG. 4 shows the state of separation which was observed when iron powder is added to the layer of the positive electrode active material in the battery cell, pertaining to the Example. FIG. 5 shows the state of separation which was observed when copper powder is added to the layer of the positive electrode active material in the battery cell pertaining to the Example. FIG. 6 shows the state of separation which was observed when copper powder is added to the layer of the positive electrode active material in the comparative sample.

As shown in FIGS. 3 to 6, the battery cell samples are constructed such that the separator 25 is interposed between the positive electrode (in which the positive electrode mixture layer 21 is formed on both sides of the positive electrode current collector 22) and the negative electrode (in which the negative electrode mixture layer 23 is formed on both sides of the negative electrode current collector 24). On the surface of the negative electrode exists metal which had separated out from metal ions.

It is noted from FIGS. 3 and 4 that, in the case of the battery cells 4 to 7 and the battery cells 8 to 11 (in which iron powder and nickel powder is added respectively to the positive electrode active material layer), the deposited metal 28 grows forming a gently sloped cone spreading along the surface of the negative electrode 23.

It is also noted from FIG. 5 that, in the case of the battery cells 12 to 20 (in which copper powder is added to the positive electrode active material layer and the organic electrolytic solution is incorporated with polyethylene glycol), the deposited metal grows forming a gently sloped cone broadly spreading along the surface of the negative electrode 23 because the electrolytic solution easily wets the electrode surface. In addition, the organic electrolytic solution, which is incorporated also with bis-(3-Sulfopropyl)disulfide, helps metal to deposit in the form of extremely fine particles on the surface of the negative electrode.

By contrast, in the case of Comparative Sample 4 in which copper powder is added but the organic electrolytic solution is not incorporated with polyethylene glycol, metal deposited in the form of fine particles on the surface of the negative electrode but metal deposited repeatedly to accumulate on the previously deposited metal. The metal that had deposited in this manner formed needle dendrites which extend and penetrate through the separator from the negative electrode toward the positive electrode. This suggests high possibilities of microshorts occurring.

In the case of battery cells 12 to 20, in which the organic electrolytic solution is incorporated also with bis-(3-Sulfopropyl)disulfide, metal deposits in the form of extremely fine particles on the surface of the negative electrode. This is particularly true in the case where copper powder is added.

It was found that the coexistence of polyethylene glycol in the organic electrolytic solution affects the state of metal deposition. That is, copper separates out to give needle crystals while iron and nickel separate out and grow in the form of cone.

It is noted that polyethylene glycol added in an amount (say, 0.015 wt %) larger than 0.01 wt %, as in the case of the battery cells 7 and 15, causes the electrolytic solution to decrease in ion conductivity or forms a coating film on the surface of the active material, thereby increasing the battery resistance. Therefore, the amount of polyethylene glycol should preferably be 0.001 to 0.01 wt %.

Moreover, if the amount of bis-(3-Sulfopropyl)disulfide is 0.2 wt % (or less than 0.5 wt %) with respect to the content of polyethylene glycol as in the case of battery cell 16, the deposited metal does not become fine particles on the surface of the negative electrode. On the other hand, if the amount of bis-(3-Sulfopropyl)disulfide is 2.5 wt % (or more than 2.0 wt %) with respect to the content of polyethylene glycol as in the case of battery cell 20, there will be an increase in self discharge. Therefore, the amount of bis-(3-Sulfopropyl)disulfide should preferably be 0.5 to 2.0 wt %.

The secondary battery with organic electrolytic solution 20 pertaining to this embodiment employs the organic electrolytic solution which contains both polyethylene glycol and bis-(3-Sulfopropyl)disulfide. This electrolytic solution easily wets the electrode surface and makes the deposited metal into fine particles.

These characteristic properties permit the deposited metal to spread along the electrode surface and grow into a gently sloped cone. As the result, the deposited metal hardly grows and penetrates through the separator from the negative electrode toward the positive electrode. In the case where the negative electrode current collector is made of zinc, copper, silver, or the like, the foregoing is particularly effective in preventing the deposited metal from growing in needle form from the negative electrode toward the positive electrode.

Consequently, the secondary battery with organic electrolytic solution pertaining to this embodiment is characterized by its long life and high reliability on account of its ability to limit the occurrence of microshorts resulting from deposited metal, to limit voltage decrease due to short-circuits, and to limit the degradation of the electrode plates.

Second Embodiment

Figure 7:
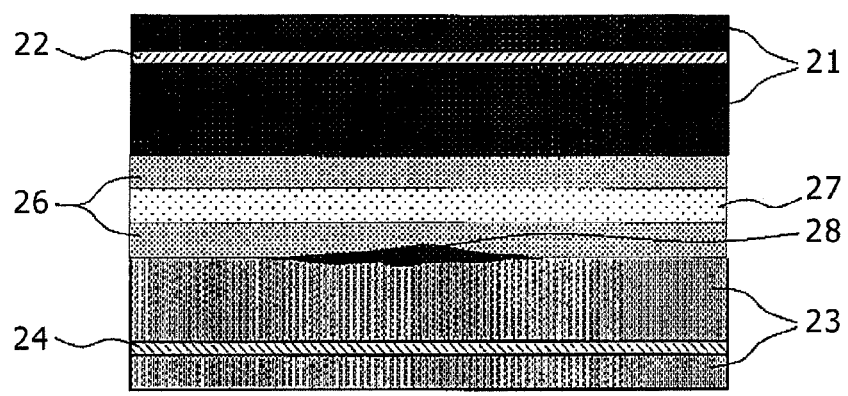
FIG. 7 is a schematic sectional view showing the state of metal separation which is observed in the battery provided with, a three-layered laminate separator.
Figure 8:
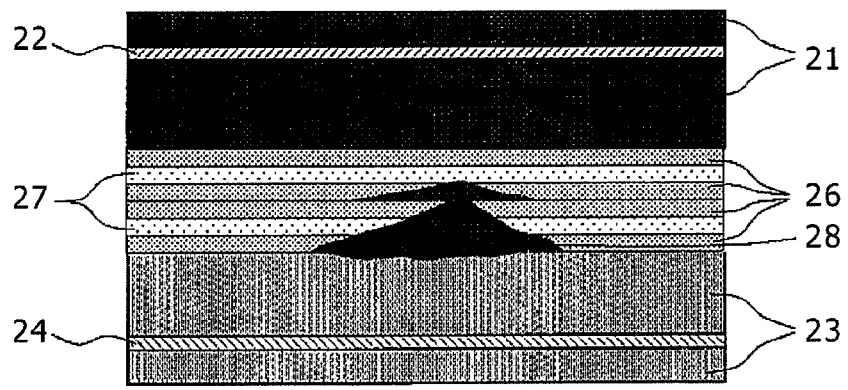
FIG. 8 is a schematic sectional view showing the state of metal separation which is observed in the battery provided with a six-layered laminate separator.

FIG. 7 is a schematic sectional view showing the state of metal deposition in the battery cell provided with a separator of three-layered laminate structure. Likewise, FIG. 8 is a schematic sectional view showing the state of metal deposition in the battery cell provided with a separator of six-layered laminate structure. Incidentally, for the sake of brevity, mutually corresponding constituents in the first and second embodiments are given identical reference numerals.

This embodiment is characterized in that the separator is of laminate structure. That is, the separator is composed of more than one layer of microporous membrane of polyolefin resin. The separator of laminate structure prevents the micropores in individual layers from easily communicating with one another and hence the deposited metal hardly grows and penetrates through the separator from the negative electrode to the positive electrode.

The separator of laminate structure shown in FIG. 7 has a three-layered laminate structure composed of one layer of polypropylene resin 27 and two layers of polyethylene resin 26 formed on both sides thereof. The separator of laminate structure shown in FIG. 8 has a six-layered laminate structure composed of two sets of the laminated separator shown in FIG. 7 which are placed on top of the other. The laminated separator has a thickness of, say, 30 μm, which is thin enough for lithium ions to pass through.

The polyethylene resin layers 26 arranged on both sides of the polypropylene resin layer 27 have smaller pores (and hence a smaller void volume) than the latter. The fact that two separators adjacent to each other vary in pore size and void volume reduces the possibility of micropores in each layer communicating with, one another.

Moreover, the polyethylene resin layers 26 arranged outside the polypropylene resin layers 27 inside have smaller pores (and hence a smaller void volume) than the latter. This structure prevents the deposited metal 28 from growing and penetrating through the laminated separators from the negative electrode toward the positive electrode.

The fact that the polypropylene resin layers 27 arranged inside have a larger pore size and void volume than the polyethylene resin layers 26 arranged outside helps improve the ion permeability in the polypropylene resin layers 27. This establishes an adequate ion permeability in the thickness direction throughout the laminated separators.

The laminated separator of three-layered structure mentioned above allows the deposited metal 28 to grow and spread along the surface of the negative electrode, as shown in FIG. 7. In addition, the laminated separator of six-layered structure mentioned above allows the deposited metal 28 to grow and spread along the surface of the negative electrode, as shown in FIG. 8. When the deposited metal 28 grows to reach the center of the separator, the laminated separator permits the deposited metal 28 to grow and spread again along the plane at which the two polyethylene resin layers 26 come into contact with each other.

Consequently, the laminated separator mentioned above prevents the deposited metal from growing and penetrating through the separator from the negative electrode toward the positive electrode, and hence it effectively prevents the occurrence of microshorts resulting from the deposited metal 28. This in turn leads to the prevention of voltage decrease and plate degradation due to microshorts. The laminated separator prevents the degradation of plates and helps improve the secondary battery with organic electrolytic solution in life and reliability.

The present invention is not restricted to the foregoing embodiments but it may be variously and broadly modified within the scope thereof. For example, the lithium-nickel-manganese-cobalt multiple oxide used in the embodiments may be replaced by any other compound as illustrated below.

The lithium-containing metal oxide may be replaced by any one of lithium-cobalt multiple oxide, lithium-nickel multiple oxide, lithium-nickel-manganese-cobalt multiple oxide, lithium manganate of spinel type, and lithium-iron multiple oxide. Moreover, the Li/Mn ratio mentioned above is not limited, and may be modified by changing the amounts of manganese oxide and lithium salt to be added. In addition, the raw materials may be incorporated with an oxide of transition metal such as Fe, Co, Ni, Cr, Al, and Mg. Such an additional element converts lithium or transition metal (such as manganese) in the crystal partly into a lithium-containing metal oxide substituted by or doped with a transition metal. It is also possible to employ a material composed of crystals which have oxygen therein replaced by or doped with S, P, or the like, or to employ a material of lamellar halite structure.

Although the foregoing embodiments demonstrate the batteries of cylindrical type, the scope of the present invention is not restricted to that type of battery; it covers batteries of square or polygonal type. The battery according to the present invention is not limited to the one mentioned above which is constructed such that the battery lid is sealed by crimping. A possible example of the modified battery is constructed such that the positive and negative external terminals penetrate through the battery lid and they push each other in the battery container, with the axial core interposed between them. In addition, the idea of the present invention may also be applied to the lithium-ion secondary battery in which the positive and negative electrodes are of laminated type instead of wound type.

In addition, the foregoing embodiments demonstrate batteries in which the negative electrode active material is amorphous carbon which is superior to crystalline carbon in adhesion to the negative electrode current collector. However, the amorphous carbon may be replaced by any one of other carbonaceous materials such as natural graphite, artificial graphite, and coke. They may take on any shape, such as flaky, spherical, fibrous, or massive. Such carbonaceous materials give a negative electrode active material which is so flexible as to easily form the set of wound electrodes. The resulting negative electrode active material hardly peels off from the negative electrode.

The scope of the present invention is not restricted to the conductive material and binder demonstrated in the foregoing embodiments. They can be any kind of product which is commonly used. The binder for the plate active material in the lithium-ion secondary battery may be selected from, in addition to the one demonstrated in the foregoing embodiments, polytetrafluoroethylene (PTFE), polyethylene, polystyrene, polybutadiene, butyl rubber, nitrile rubber, styrene-butadiene rubber, polysulfide rubber, nitrocellulose, cyanoethylcellulose, latexes, and polymers of acrylonitrile, vinyl fluoride, vinylidene fluoride, propylene fluoride, and chloroprene fluoride, and mixtures thereof.

Moreover, although the foregoing embodiments employ a non-aqueous electrolytic solution which is composed of a 1:1:1 mixed solvent of EC, DMC, and DEC and $LiPF_6$ dissolved therein, this non-aqueous electrolytic solution may be replaced by one which is composed of an organic solvent and a common lithium salt (as an electrolyte) dissolved therein.

The present invention is not specifically restricted in the kind of lithium salt and organic solvent used therein. The electrolyte may be selected from $LiClO_4$, $LiAsF_6$, $LiBF_4$, $LiB(C_6H_5)_4$, $CH_3SO_3Li$, $CF_3SO_3Li$, and mixtures thereof.

The above-mentioned organic solvent may be replaced by any one or more (in mixture) of propylene carbonate, 1,2-dimethoxyethane, 1,2-diethoxyethane, γ-butyrolactone, tetrahydrofuran, 1,3-dioxolane, 4-methyl-1,3-dioxolane, diethyl ether, sulfolane, methylsulfolane, acetonitrile, and propionitrile. Their mixing ratio is not specifically restricted. The non-aqueous electrolytic solution mentioned above improves the battery capacity and makes the battery usable in cold districts.

The invention claimed is:

1. A secondary battery with organic electrolytic solution, the secondary battery including a set of plates for a positive electrode and negative electrode, with a separator interposed between them, and an organic electrolytic solution composed of an organic solvent and an electrolyte dissolved therein,
    wherein the organic electrolytic solution contains polyethylene glycol and bis-(3-Sulfopropyl)disulfide.
2. The secondary battery with organic electrolytic solution as defined in claim 1, wherein
    the polyethylene glycol is contained in an amount of 0.001 to 0.01 wt % for a total amount (by weight) of the organic solvent, and
    the bis-(3-Sulfopropyl)disulfide is contained in an amount of 0.5 to 2 wt % for the total amount (by weight) of the polyethylene glycol.
3. The secondary battery with organic electrolytic solution as defined in claim 1, wherein the separator is a laminate separator of multiple layer structure.
4. The secondary battery with organic electrolytic solution as defined in claim 3, wherein the separator is composed of a plurality of microporous membrane of polyolefin resin.
5. The secondary battery with organic electrolytic solution as defined in claim 4, wherein the laminate separator is constructed such that adjacent layers differ from each other in at least either of pore diameter and pore volume.

* * * * *